(12) United States Patent
Schaefer

(10) Patent No.: US 11,459,346 B2
(45) Date of Patent: Oct. 4, 2022

(54) SILANES COMPRISING OXAMIDO ESTER GROUPS

(71) Applicant: WACKER CHEMIE AG, Munich (DE)

(72) Inventor: Oliver Schaefer, Burghausen (DE)

(73) Assignee: WACKER CHEMIE AG, Munich (DE)

(*) Notice: Subject to any disclaimer, the term of this patent is extended or adjusted under 35 U.S.C. 154(b) by 0 days.

(21) Appl. No.: 16/955,548

(22) PCT Filed: Dec. 19, 2017

(86) PCT No.: PCT/EP2017/083534
§ 371 (c)(1),
(2) Date: Jun. 18, 2020

(87) PCT Pub. No.: WO2019/120483
PCT Pub. Date: Jun. 27, 2019

(65) Prior Publication Data
US 2021/0079027 A1     Mar. 18, 2021

(51) Int. Cl.
*C07F 7/18*     (2006.01)

(52) U.S. Cl.
CPC .......... *C07F 7/1804* (2013.01); *C07F 7/1892* (2013.01)

(58) Field of Classification Search
None
See application file for complete search history.

(56) References Cited

U.S. PATENT DOCUMENTS

| | | | |
|---|---|---|---|
| 3,746,738 A | 7/1973 | Pepe et al. | |
| 7,371,464 B2* | 5/2008 | Sherman | C08G 69/42 428/447 |
| 8,673,419 B2* | 3/2014 | Determan | C09J 7/243 428/40.1 |
| 2007/0149745 A1 | 6/2007 | Leir et al. | |

FOREIGN PATENT DOCUMENTS

| | | |
|---|---|---|
| DE | 2315242 A1 | 10/1973 |
| WO | 2009002667 A1 | 12/2008 |
| WO | 2011012600 A1 | 2/2011 |

OTHER PUBLICATIONS https://pubchemdocs.ncbi.nlm.nih.gov/record-dates, downloaded Feb. 10, 2022.*

Nagel et al., "The First Stereospecific Catalytic Hydrogenation With a Polymer Supported Optically Active Rhodium Complex", Journal of the Chemical Society, Chemical Communications, Jan. 1, 1986, vol. 14, pp. 1098-1099, XP009505292.

Choi et al., Abstract of: "Design, synthesis, and biological evaluation of Plasmodium falciparum lactate dehydrogenase inhibitors", Journal of Medical Chemistry, 2007, vol. 50, pp. 3841-3850, Database Reaxys [online] Elsevier, XP002780948; Database accession No. XRN 11152019, XRN 11152020.

Timmers et al., Abstract of: "Ring-Annulated Dihydropyrrolo [2,1-Alpha] Isoquinolines", 2011, Database Reaxys [online] Elsevier; N.V. Organon: XRN 21060136, XP002780947, Database accession No. XRN 21060136.

PubChem: "ethyl 2-[3-[methoxy(dimethyl)silyl]propylamino]-2-oxoacetate", NIH U.S. National Library of Medicine National Center for Biotechnology Information, Feb. 13, 2015, pp. 1-9, XP055474233.

* cited by examiner

*Primary Examiner* — Clinton A Brooks
(74) *Attorney, Agent, or Firm* — Brooks Kushman P.C.

(57) ABSTRACT

Oxamidoester-functional alkylalkoxysilanes are prepared in high yield by the reaction of an alkylalkoxysilane with an oxalic diester.

4 Claims, No Drawings

SILANES COMPRISING OXAMIDO ESTER GROUPS

CROSS REFERENCE TO RELATED APPLICATIONS

This application is the U.S. National Phase of PCT Appln. No. PCT/EP2017/083534 filed Dec. 19, 2017, the disclosure of which is incorporated in its entirety by reference herein.

BACKGROUND OF THE INVENTION

1. Field of the Invention

The invention relates to silanes having oxamidoester groups, to a method for the preparation thereof, and to the use thereof.

2. Description of the Related Art

The chemical group

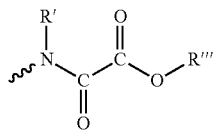

is often referred to as a 2-amino-2-oxoacetate or oxamide group or as an oxamidoester group, with the term oxamidoester being used to refer to this group hereinbelow. The combination of the half-ester structure with an oxo group means that oxamidoesters have the advantage of being more reactive than amides or carbamates, especially when reacting with amines or alcohols. They are, however, appreciably more stable than isocyanate structures—for example they do not dimerize or trimerize and are appreciably less reactive, which makes reaction control with these groups much more straightforward.

Trialkoxysilanes containing oxamidoester groups are mentioned in DE 23 15 242 C2 in the reaction with polyazamide solutions. A method for preparing such products is not however described therein. Moreover, these trialkoxy-functional silanes have the disadvantage that their trifunctionality makes them of only very limited utility as a structural unit for preparing correspondingly functionalized siloxanes, as described inter alia in US-A 2007/149745.

Means have accordingly been sought for preparing, in high purity, silanes containing oxamidoester groups which can be employed with great flexibility, for example in the preparation of oxamido-functional siloxanes. One known way of preparing silanes containing oxamidoester groups is the hydrosilylation of unsaturated oxamidoesters with Si—H functional silanes, as described in WO 2009/002667. However, this method has the disadvantage of having to work with highly volatile chlorosilanes that need to be handled using special apparatuses.

WO 2011/090644 A2 describes an oxalate aminosilane, the preparation thereof, and use thereof in the production of adhesion promoters.

SUMMARY OF THE INVENTION

The invention provides silanes having oxamidoester groups, of the general formula

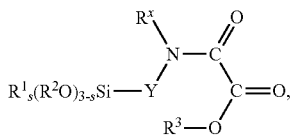

where
$R^1$ may be identical or different and represents monovalent, optionally substituted, SiC-attached hydrocarbon radicals that may be interrupted by heteroatoms,
$R^2$ may be identical or different and represents a hydrogen atom or monovalent, optionally substituted hydrocarbon radicals that may be interrupted by heteroatoms,
$R^3$ represents monovalent, optionally substituted hydrocarbon radicals that may be interrupted by oxygen atoms,
$R^x$ represents a hydrogen atom or optionally substituted hydrocarbon radicals,
Y represents divalent, optionally substituted hydrocarbon radicals that may be interrupted by oxygen atoms or nitrogen atoms, and
s is 1, 2 or 3, preferably 1 or 2.

DETAILED DESCRIPTION OF THE PREFERRED EMBODIMENTS

Examples of hydrocarbon radicals $R^1$ are alkyl radicals such as the methyl, ethyl, n-propyl, isopropyl, n-butyl, isobutyl, tert-butyl, n-pentyl, isopentyl, neopentyl, and tert-pentyl radicals; hexyl radicals such as the n-hexyl radical; heptyl radicals such as the n-heptyl radical; octyl radicals such as the n-octyl radical and isooctyl radicals such as the 2,2,4-trimethylpentyl radical; nonyl radicals such as the n-nonyl radical; decyl radicals such as the n-decyl radical; dodecyl radicals such as the n-dodecyl radical; octadecyl radicals such as the n-octadecyl radical; cycloalkyl radicals such as the cyclopentyl, cyclohexyl, cycloheptyl, and methylcyclohexyl radicals; alkenyl radicals such as the vinyl, 1-propenyl and 2-propenyl radicals; aryl radicals such as the phenyl, naphthyl, anthryl and phenanthryl radicals; alkaryl radicals such as the o-, m-, p-tolyl radicals, xylyl radicals, and ethylphenyl radicals; and aralkyl radicals such as the benzyl radical and the α- and β-phenylethyl radicals.

Examples of substituted hydrocarbon radicals $R^1$ are halogenated hydrocarbon radicals such as the chloromethyl, 3-chloropropyl, 3-bromopropyl, 3,3,3-trifluoropropyl, and 5,5,5,4,4,3,3-heptafluoropentyl radical and also the chlorophenyl radical; hydroxyalkyl radicals such as the hydroxypropyl radical; or epoxy radicals such as the glycidyloxypropyl radical.

The radical $R^1$ is preferably an SiC-attached hydrocarbon radical having 1 to 20 carbon atoms, optionally substituted with halogen atoms or hydroxy groups, which may be interrupted by oxygen atoms, preferably a hydrocarbon radical having 1 to 6 carbon atoms, more preferably an aliphatic hydrocarbon radical having 1 to 6 carbon atoms, and in particular the methyl, ethyl or propyl radical, most preferably the methyl radical.

Examples of radicals $R^2$ are the radicals listed for radical $R^1$ and also polyalkylene glycol radicals attached via a carbon atom,
or a hydrogen atom.

The radicals $R^2$ are preferably hydrogen or monovalent, optionally substituted hydrocarbon radicals that may be interrupted by oxygen atoms, more preferably hydrocarbon radicals having 1 to 6 carbon atoms, in particular the methyl, ethyl or propyl radical.

Examples of radical $R^3$ are the radicals listed for radical $R^1$ and also polyalkylene glycol radicals attached via a carbon atom.

The radicals $R^3$ are preferably monovalent, optionally substituted hydrocarbon radicals that may be interrupted by oxygen atoms, more preferably hydrocarbon radicals having 1 to 6 carbon atoms, in particular the methyl, ethyl or propyl radical.

Examples of radical $R^x$ are the radicals listed for radical $R^1$ or a hydrogen atom.

Preferably, radical $R^x$ represents a hydrogen atom or hydrocarbon radicals optionally substituted with —CN, -halogen or with alkoxysilyl groups, preferably a hydrogen atom or alkyl groups, more preferably a hydrogen atom or linear alkyl groups having 1 to 6 carbon atoms, in particular a hydrogen atom, the methyl or ethyl radical, most preferably a hydrogen atom.

Examples of radical Y are alkylene radicals such as the methylene, ethylene, n-propylene, isopropylene, n-butylene, isobutylene, tert-butylene, n-pentylene, isopentylene, neopentylene, and tert-pentylene radicals, hexylene radicals such as the n-hexylene radical, heptylene radicals such as the n-heptylene radical, octylene radicals such as the n-octylene radical and isooctylene radicals such as the 2,2,4-trimethylpentylene radical, nonylene radicals such as the n-nonylene radical, decylene radicals such as the n-decylene radical, dodecylene radicals such as the n-dodecylene radical; alkenylene radicals such as the vinylene and the allylene radical; and cycloalkylene radicals such as cyclopentylene, cyclohexylene, cycloheptylene radicals, and methylcyclohexylene radicals.

The radical Y is preferably an alkylene radical optionally substituted with heteroatoms, preferably with oxygen, nitrogen, fluorine or chlorine, preferably an alkylene radical having 1 to 6 carbon atoms optionally substituted with oxygen, nitrogen, fluorine or chlorine, more preferably a methylene, propylene butylene or ethylaminopropyl radical, in particular the n-propylene radical.

Examples of silanes according to the invention are those of the formula (I), where
$R^1$=—$CH_3$, $R^2$=—$CH_3$, $R^3$=—$CH_2CH_3$, $R^x$=—H, Y=—$CH_2CH_2CH_2$—, s=2, $R^1$=—$CH_3$, $R^2$=—$CH_2CH_3$, $R^3$=—$CH_2CH_3$, $R^x$=—H, Y=—$CH_2CH_2CH_2$—, s=2,
$R^1$=—$CH_3$, $R^2$=—$CH_3$, $R^3$=—$CH_3$, $R^x$=—H, Y=—$CH_2CH_2CH_2$—, s=2,
$R^1$=—$CH_3$, $R^2$=—$CH_3$, $R^3$=—$CH_2CH_3$, $R^x$=—H, Y=—$CH_2CH_2CH_2$—, s=1,
$R^1$=—$CH_3$, $R^2$=—$CH_2CH_3$, $R^3$=—$CH_2CH_3$, $R^x$=H, Y=—$CH_2CH_2CH_2$—, s=1,
$R^1$=—$CH_3$, $R^2$=—$CH_2CH_3$, $R^3$=—$CH_3$, $R^x$=—H, Y=—$CH_2CH_2CH_2$—, s=1,
$R^1$=—$CH_3$, $R^3$=—$CH_2CH_3$, $R^x$=—H, Y=—$CH_2CH_2CH_2$—, s=3,
$R^1$=—$CH_3$, $R^3$=—$CH_3$, $R^x$=—H, Y=—$CH_2CH_2CH_2$—, s=3,
$R^1$=—$CH_3$, $R^2$=—$CH_3$, $R^3$=—$CH_2CH_3$, $R^x$=—H, Y=—$CH_2$—, s=2,
$R^1$=—$CH_3$, $R^2$=—$CH_2CH_3$, $R^3$=—$CH_2CH_3$, $R^x$=—H, Y=—$CH_2$—, s=2,
$R^1$=—$CH_3$, $R^2$=—$CH_2CH_3$, $R^3$=—$CH_3$, $R^x$=—H, Y=—$CH_2$—, s=2,
$R^1$=—$CH_3$, $R^2$=—$CH_2CH_3$, $R^3$=—$CH_2CH_3$, $R^x$=—H, Y=—$CH_2CH_2CH_2$—NH—$CH_2CH_2$, s=2,
$R^1$=—$C_6H_5$, $R^2$=—$CH_3$, $R^3$=—$CH_2CH_3$, $R^x$=—H, Y=—$CH_2$—, s=2,
$R^1$=—$C_6H_5$; $R^2$=—$CH_2CH_3$, $R^3$=—$CH_2CH_3$, $R^x$=—H, Y=—$CH_2$—, s=2, and
$R^1$=—$C_6H_5$, $R^2$=—$CH_2CH_3$, $R^3$=—$CH_3$, $R^x$=—H, Y=—$CH_2$—, s=2.

The silanes according to the invention are preferably mono- or dialkoxysilane compounds based on aliphatic oxamidoesters. Particularly preferable are mono- or dimethoxysilane compounds or mono- or diethoxysilane compounds based on aliphatic oxamidoesters.

The silanes according to the invention are preferably colorless compounds, more preferably colorless compounds that are stable in the absence of water.

The invention further provides a method for preparing silanes having oxamidoester groups by reacting aminosilanes (A) of the formula

with oxalic diesters (B) of the general formula

where
$R^1$, $R^2$, $R^3$, $R^x$, and Y have one of the meanings defined above and t is 0, 1, 2 or 3, preferably 1 or 2.

Examples of aminosilanes of the formula (II) used according to the invention are aminoalkylalkoxysilanes that are commercially available, for example the commercial products Geniosil® GF 92, Geniosil® GF 93, Geniosil® GF 96, and Geniosil® XL 926 from Wacker Chemie AG or the commercial products Dynasilan® 1189, Dynasilan® 1122, Dynasilan® 1124, Dynasilan® 1505, Dynasilan® AMEO, and Dynasilan® AMMO from Evonik Industries AG.

The aminosilanes of the formula (II) used according to the invention are preferably 3-aminopropyldimethylmethoxysilane, 3-aminopropyldiethoxymethylsilane, 3-aminopropyltriethoxysilane, 3-aminopropyltrimethoxysilane, N-(2-aminoethyl)-3-aminopropyltrimethoxysilane, 3-(2-aminomethylamino)propyltriethoxysilane, N-(2-aminoethyl)-3-aminopropylmethyldimethoxysilane, N-cyclohexyl-3-aminopropyltrimethoxysilane, N-cyclohexylaminomethyltriethoxysilane, bis(3-triethoxysilylpropyl)amine, bis(3-trimethoxysilylpropyl)amine, and N-(n-butyl)-3-aminopropyltrimethoxysilane, more preferably 3-aminopropyldimethylmethoxysilane, 3-aminopropyldiethoxymethylsilane, 3-aminopropyltriethoxysilane, and 3-aminopropyltrimethoxysilane.

Examples of compounds of the formula (III) used according to the invention are diethyl oxalate, dimethyl oxalate, and diisopropyl oxalate.

The compounds of the formula (III) used according to the invention are preferably dialkyl oxalates, more preferably diethyl oxalate.

In the method according to the invention, the molar ratio of compound of the formula (III) to aminosilanes of the formula (II) is preferably greater than 1:1, more preferably between 1:1 and 10:1, in particular between 2:1 and 6:1.

The excess of component (III) preferred in accordance with the invention has the advantage in particular that it allows the formation of by-products such as oxalic diamides to be largely avoided.

In addition to components (A) and (B), further components may be used in the method according to the invention, for example organic solvents (C), organic or inorganic catalysts or, inter alia, alcohols with which the alkoxy radical of the silane may be replaced at the same time, but preference is not given to this.

The method may be carried out in the presence or in the absence of solvents (C). If solvents (C) are used, preference is given to solvents or solvent mixtures having a boiling point/boiling range of up to 120° C. at 0.1 MPa. Examples of such solvents are ethers, such as dioxane, tetrahydrofuran, diethyl ether, diisopropyl ether, diethylene glycol dimethyl ether; chlorinated hydrocarbons, such as dichloromethane, trichloromethane, tetrachloromethane, 1,2-dichloroethane, trichloroethylene; hydrocarbons, such as pentane, n-hexane, hexane isomer mixtures, heptane, octane, cleaners' naphtha, petroleum ether, benzene, toluene, xylenes; alcohols, such as ethanol, isopropanol or butanol; esters, such as ethyl acetate, butyl acetate, propyl propionate, ethyl butyrate, ethyl isobutyrate; carbon disulfide, and nitrobenzene, or mixtures of such solvents. Preference is given to carrying out the method according to the invention in the absence of solvent (C).

The components used in the method of the invention may in each case be a single type of the component concerned or may be a mixture of two or more types of a particular component. The reaction of components (A) and (B) according to the invention normally occurs spontaneously and exothermically, preferably without the addition of catalysts.

In the method according to the invention, the components used may be freely mixed with one another in a known manner. In a preferred embodiment, the reaction components are intermixed. To ensure the reaction components are thoroughly intermixed, the reaction may be carried out, for example, with stirring. In the method according to the invention, the reactor is initially charged with the compound of the general formula (III) and silane (A) is added dropwise. The dropwise addition here may be carried out either at room temperature or at elevated temperature. The heat evolved during the reaction may potentially be used to heat the reaction mixture. The elimination products that are formed, for example alcohols, may be removed during the reaction through the selection of appropriate reaction parameters, in particular pressure and temperature. If the method according to the invention uses compounds of the formulae (II) and (III) in which the radicals $R^2$ are different from the radicals $R^3$, elimination products $R^3$—OH that, depending on the embodiment, may potentially remain in the reaction mixture may result in the organyloxysilanes used as reaction components receiving a different organyloxy group through exchange of the group ($R^2$—O) with the elimination product $R^3$—OH. The new alcohols $R^2$—OH thereby formed from the organyloxysilanes can in turn undergo exchange with radical $R^3$ on the remaining ester group in the oxamidoestersilane. However, the transesterified by-products thereby formed exhibit chemical properties that are in principle similar to those of the desired main products and—where they cannot be removed by distillation—have little or no adverse effect on the use of the latter.

The choice of a suitable reactor for carrying out the method according to the invention is largely determined here by the dissipation of the heat evolved during the reaction and also by the intermixing of the reaction components and potentially by the removal of the elimination products that are formed. In addition to conventional stirred-tank reactors, semi-continuous reactors or continuous reactors may also be employed for this purpose.

The reaction according to the invention may be carried out at any desired temperature, with the lower temperature tolerance defined by the solubility of the reaction components and the upper tolerance by the decomposition temperatures of the reactants and the products. Preferably, the method according to the invention is carried out at 0° C. to 150° C., more preferably at 20 to 150° C., yet more preferably at 40 to 100° C., and in particular at 60 to 90° C.

The method according to the invention is preferably carried out at a pressure of 300 to 100,000 hPa. Advantageous for the reaction is an embodiment at a pressure of 400 to 1100 hPa.

In order to avoid problems such as oxidation and consequent discoloration of the aminosilanes as far as possible, the reaction is preferably carried out under inert gas, more preferably nitrogen or argon, most preferably nitrogen. In order to avoid hydrolysis of the organyloxysilane units and potential condensation of the silanol groups thereby formed, which would lead to a reduction in yield, the reactants and any solvents used should be employed in a form that is as anhydrous as possible.

At the end of the reaction according to the invention, the resulting silanes having oxamidoester groups may be isolated and purified by known industrial methods, for example filtration, extraction or distillation. In the method according to the invention, the resulting silanes having oxamidoester groups are preferably separated by distillation, more preferably by distillation carried out under reduced pressure (vacuum distillation).

The method according to the invention may be carried out one batch at a time or as a semi-continuous or completely continuous process, preferably as a batchwise process.

The method according to the invention has the advantage that it may be carried out easily and quickly.

The method according to the invention has the advantage that silanes having oxamidoester groups are obtained in high purity and high yield and may be easily purified by distillation.

The method according to the invention has the further advantage that easily obtainable, inexpensive, and easy-to-process reactants may be used here.

The silanes according to the invention have the advantage that they are extremely thermally stable.

In addition, the silanes according to the invention have the advantage of having high polarity.

The silanes according to the invention or produced according to the invention may be used for all purposes for which compounds having oxamidoester groups have also previously been used.

For example, the silanes according to the invention are advantageously outstandingly suitable for adhesion to oxidic surfaces.

In the examples described below, all parts and percentages are by weight unless otherwise stated. In addition, all viscosity data refer to a temperature of 25° C. Unless otherwise stated, the examples described below are carried out at ambient pressure, i.e. about 1010 hPa, and at room temperature, i.e. about 20° C., or at a temperature attained on mixing the reactants at room temperature without additional heating or cooling.

Hereinbelow

Me represents the methyl radical and

Et represents the ethyl radical.

The embodiments hereinbelow were all carried out under nitrogen as inert gas, with the apparatus used inertized by three cycles of evacuation to 10 hPa followed by filling the apparatus with nitrogen.

EXAMPLE 1

A 2 L 3-necked flask equipped with thermocouple, stirrer, and reflux condenser was charged with 876 g (6.0 mol) of diethyl oxalate (146.14 g/mol). To this was added 295 g (2 mol) of 3-aminopropyldimethylmethoxysilane (147.29 g/mol) with stirring at a temperature of 22° C., over a period of 3 hours, making sure that the temperature in the flask did not rise above 70° C. The mixture was then stirred for a further 30 minutes. The resulting slightly yellow solution was then transferred to a distillation apparatus consisting of a flask, distillation bridge, thermometer, and receiver vessel. The ethanol that had formed was removed herewith by distillation at standard pressure and a bottoms temperature of 90° C., followed by removal of the diethyl oxalate that was used in excess by distillation under reduced pressure (90° C. bottoms temperature, 2 mbar). The resulting residue was then recovered by distillation at a pressure of 2 hPa and an overhead temperature of 142° C. This afforded 412 g of a colorless mixture of EtO—CO—CO—HN—$CH_2CH_2CH_2$—Si—$Me_2$(OMe) (247.36 g/mol, 62 mol-%) and EtO—CO—CO—HN—$CH_2CH_2CH_2$—Si—$Me_2$(OEt) (261.39 g/mol, 38 mol-%).

EXAMPLE 2

A 2 L 3-necked flask equipped with thermocouple, stirrer, and reflux condenser was charged with 1023 g (7.0 mol) of diethyl oxalate (146.14 g/mol). To this was added 382.5 g (2 mol) of 3-aminopropyldiethoxymethylsilane (191.34 g/mol), at 22° C., with stirring, over a period of 4 hours, making sure that the temperature in the flask did not rise above 75° C. The mixture was then stirred for a further 30 minutes. The resulting slightly yellow solution was then transferred to a distillation apparatus consisting of a flask, distillation bridge, thermometer, and receiver vessel. The ethanol that had formed was removed herewith by distillation at standard pressure and a bottoms temperature of 90° C., followed by removal of the diethyl oxalate that was used in excess by distillation under reduced pressure (90° C. bottoms temperature, 2 mbar). The resulting residue was then recovered by distillation at a pressure of 2 hPa and an overhead temperature of 148° C. This afforded 472 g of colorless EtO—CO—CO—HN—$CH_2CH_2CH_2$—Si—Me(OEt)$_2$ (291.42 g/mol).

EXAMPLE 3

A 2 L 3-necked flask equipped with thermocouple, stirrer, and reflux condenser was charged with 584.6 g (4.0 mol) of diethyl oxalate (146.14 g/mol). To this was added 221.4 g (1 mol) of 3-aminopropyltriethoxysilane (221.37 g/mol), at 22° C., with stirring, over a period of 3 hours, making sure that the temperature in the flask did not rise above 70° C. The mixture was then stirred for a further 30 minutes. The resulting slightly yellow solution was then transferred to a distillation apparatus consisting of a flask, distillation bridge, thermometer, and receiver vessel. The ethanol that had formed was removed herewith by distillation at standard pressure and a bottoms temperature of 90° C., followed by removal of the diethyl oxalate that was used in excess by distillation under reduced pressure (90° C. bottoms temperature, 2 mbar). The resulting residue was then recovered by distillation at a pressure of 2 hPa and an overhead temperature of 153° C. This afforded 239.8 g of colorless EtO—CO—CO—HN—$CH_2CH_2CH_2$—Si—(OEt)$_3$ (321.44 g/mol).

EXAMPLE 4

A 1 L 3-necked flask equipped with thermocouple, stirrer, and reflux condenser was charged with 354 g (3.0 mol) of dimethyl oxalate (118.03 g/mol). To this was added 147 g (1 mol) of 3-aminopropyldimethylmethoxysilane (147.29 g/mol), at 70° C., with stirring, over a period of 2 hours, making sure that the temperature in the flask did not rise above 100° C. The mixture was then stirred for a further 30 minutes. The resulting slightly yellow solution was then transferred to a distillation apparatus consisting of a flask, distillation bridge, thermometer, and receiver vessel. The methanol that had formed was removed herewith by distillation at standard pressure and a bottoms temperature of 90° C., followed by removal of the dimethyl oxalate that was used in excess by distillation under reduced pressure (90° C. bottoms temperature, 2 mbar). The resulting residue was then recovered by distillation at a pressure of 2 hPa and an overhead temperature of 137° C. This afforded 192 g of colorless product MeO—CO—CO—HN—$CH_2CH_2CH_2$—Si—$Me_2$(OMe) (233.11 g/mol).

The invention claimed is:

1. A method for preparing silanes having oxamidoester groups, of the formula

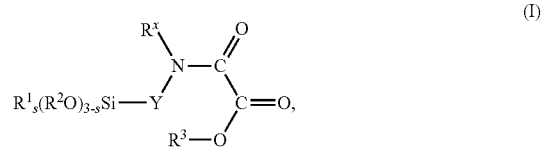

comprising: reacting aminosilanes (A) of the formula

with oxalic diesters (B) of the formula

where $R^1$ are identical or different and represent monovalent, optionally substituted, SiC-attached hydrocarbon radicals optionally interrupted by heteroatoms, $R^2$ are identical or different and represent hydrogen or monovalent, optionally substituted hydrocarbon radicals optionally interrupted by heteroatoms, $R^3$ represents a monovalent, optionally substituted hydrocarbon radical optionally interrupted by oxygen atoms, $R^x$ represents hydrogen or an optionally substituted hydrocarbon radical, Y represents a divalent, optionally substituted hydrocarbon radical optionally interrupted by oxygen atoms or nitrogen atoms, and s is 1 or 2, and t is 1 or 2.

2. The method of claim 1, wherein the molar ratio of compound(s) of the formula (III) to aminosilanes of the formula (II) is greater than 1:1.

3. The method of claim 1, wherein the reaction is carried out at 0° C. to 150° C.

4. The method of claim 1, wherein the reaction is carried out at a pressure of 400 to 1100 hPa.

\* \* \* \* \*